Aug. 10, 1943.　　　　E. ERNST　　　　2,326,448
KNOCK-DOWN FLAT OFFSET GAUGE
Filed Sept. 11, 1942

Inventor,
Eugene Ernst
by Iris Shumacher
Atty.

Patented Aug. 10, 1943

2,326,448

UNITED STATES PATENT OFFICE 2,326,448

KNOCKDOWN FLAT OFFSET GAUGE

Eugene Ernst, Livingston, N. J.

Application September 11, 1942, Serial No. 457,993

5 Claims. (Cl. 73—329)

This invention relates to offset gauges, and has particular reference to gauges of the so-called flat glass type.

It has been known to make such gauges of extremely heavy and rugged construction to withstand the maximum pressures of modern high pressure boilers without substantial warping due to heat. The preferred practice was to use a single or common central chambered plate for both of the gage units in order to increase the strength and rigidity of the construction. However, the resultant machining and handling involved was a source of considerable expense, especially as precision work was required for an accurate fit of the glass plates. If the gage required repair or special cleaning it was generally necessary to completely disassemble the entire gauge so that the operator was deprived of a water level reading for a considerable period of time.

It is therefore an object of the invention to avoid these difficulties and disadvantages by the provision of novel means whereby identical interchangeable gauge units are employed in each gauge.

Another object of the invention is to furnish improved means to reduce the weight of metal required, the amount of machining necessary and the labor entailed especially in cleaning and repair work.

By reducing the massiveness of the gauge, the same may become subject to distortion stresses at the high temperatures of use, and once the gauge is taken apart it may be very difficult or impossible to put it together again in a leak proof manner.

Accordingly another object of the invention is to provide improved means for accurate connection of parts of the gauge even if warping has occurred.

A further object is the provision of an improved knockdown, flat, offset water level gauge which is highly efficient under all the circumstances obtaining in power plants.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated on the annexed drawing, wherein like parts are designated by the same reference characters throughout the several views.

Figure 1:
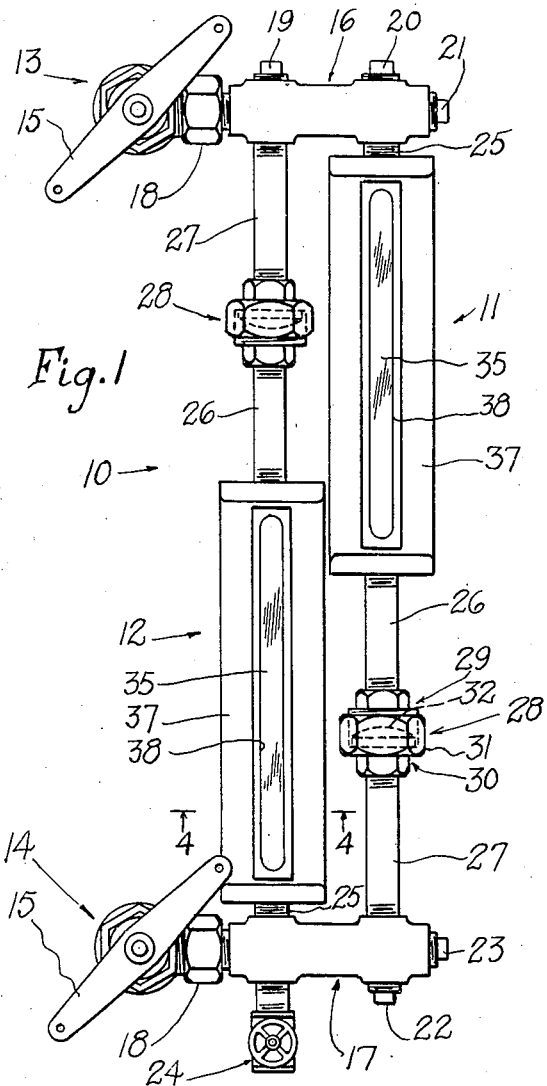
Figure 1 is a front elevation of a gauge embodying the invention, this view being partially conventionalized by omission of the clamping means for the gauge units.

The advantages of the invention as here outlined are best realized when all of its features and instrumentalities are combined in one and the same structure, but, useful devices may be produced embodying less than the whole.

It will be obvious to those skilled in the art to which this invention appertains, that the same may be incorporated in several different constructions. The accompanying drawing, therefore, is submitted merely as showing the preferred exemplification of the invention.

Referring in detail to the drawing, 10 denotes a water level gauge embodying the invention. The same may be of the offset type, and hence includes a plurality of water level gage units 11 and 12, disposed in closely side by side, parallel relation to each other, with the lower sight portion of the upper gauge unit overlapping the upper sight portion of the lower unit. These gauge units are suitably interconnected for a parallel path of flow to thus form the gauge 10 which is adapted to be mounted on the water column of a high pressure boiler in a conventional manner. Preferably upper and lower cut-out valves 13, 14 (which may also have automatic ball check valves) are connected to the water column, and are provided with lever arms that may be interconnected by chains (not shown) so that they can be closed simultaneously if a leak develops in the gauge, especially if the leak is insufficient to cause the ball valves to close. Mounted on the valves 13, 14 are upper and lower heads 16, 17 having union fittings 18 for detachable connection with the valves, whereby the gauge 10 can be removed as a complete unit.

Each of the heads 16, 17 has one or more openings, each of the latter preferably being a through passage, and the heads may also have end openings. Certain of the openings in the head 16 are closed by plugs 19, 20 and 21, and certain of the openings in the head 17 are closed by plugs 22, 23. By removal of the plugs 19, 20 and 22, some cleaning of the gauge may be effected, and by removal of the plugs 21 and 23, access for cleaning is obtained to the heads and into the valves 13, 14. One of the openings in the lower head 17 is provided with a clean out valve 24 whereby the gauge 10 can be flushed or blown out. To the remaining openings in the heads are connected nipples or pipes as the case may be for mounting the gauge units 11 and 12 as hereinafter described. It will be perceived that the heads 16, 17 are identical and interchangeable.

Each gauge unit 11, 12 has a nipple 25 at one end and a pipe at the opposite end. If desired, the nipples may be permanently screwed into the gauge units. At least one connection for each gauge unit is detachable. Thus the pipes mentioned may each be split into long nipples or pipe sections 26, 27, these being interconnected by detachable fittings of the bolted flange or union type. Preferably, I employ the conventional union fittings 28 comprising opposed seating portions 29, 30 screwed on the pipe sections and interconnected by a threaded collar 31. These unions may also have ball joint seats as indicated at 32 for a purpose hereinafter described. A union fitting has the advantage of being rather compact and small, to permit the gauge units to lie closely side by side, with the various connections in alignment with the gauge; it also possesses the advantage of permitting a ball joint seat to be used.

Each gauge unit may be of the so-called flat glass type which is especially adapted to withstand the extreme temperatures and pressures encountered in high pressure boilers. Each may have a central plate 33 having a central channel or slot-like chamber 34, closed at one or both sides by plane glass strips 35, whose inner faces may be protected by mica 36 from erosion by condensate. Clamping plates 37 overlie the glass plates and are provided with beveled slot sight openings 38 which are in alignment with each other for the passage of light to thus increase visibility of the water level. Powerful bolts 39 clamp together the parts to avoid leakage at the glass plates. To avoid warping of the metal plates and consequent leakage, or breakage of the glass plates, the plates 33 and 37 are made of special steel and are very heavy. Because the bolts 39 must be rather closely spaced lengthwise of the gauge, the massiveness of the structure is further increased. Even so, breakage of the glass plates is rather common, and in the endeavor to reduce such breakage, the offset type of gauge is used, because the length of the glass plates is thus substantially reduced.

Figure 2:
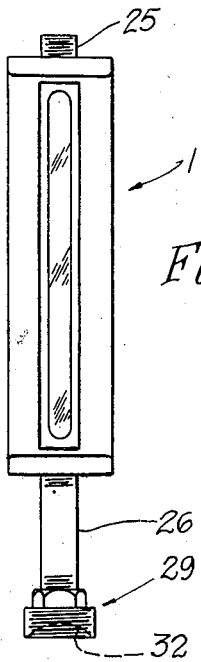
Fig. 2 is a similar view showing one of the identical interchangeable gauge units removed from the device of Fig. 1.
Figure 3:
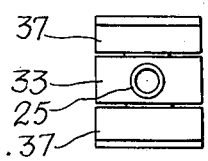
Fig. 3 is a top plan view of the same.
Figure 4:
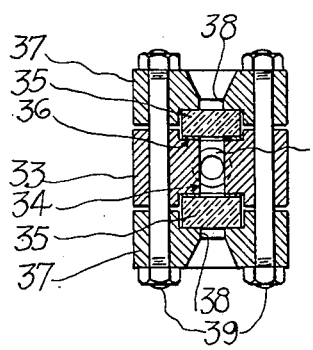
Fig. 4 is a sectional view on the line 4—4 of Fig. 1.

The union fittings facilitate repair, replacement and cleaning of the gauge units. A glass plate may break, or the mica may become broken and displaced, or dirt and chemical action may prevent satisfactory operation of the gauge or obscure the glass. Thus it may be insufficient to merely blow down the gauge. With this invention, a gauge unit as shown in Fig. 2 may be easily and quickly removed, and replaced by another, so that the operator need not wait a long time until he can again observe the water level. The repair or cleaning may then be done at leisure or the gauge unit may be shipped to the factory.

For manufacturing reasons the gauge units 12, 13 are identical and interchangeable, thus adding further advantage to the use of the union fittings.

In some cases, it is desirable to weld the nipple 25 and the pipe sections 26 to supplement the threads. In that event, a gauge unit upon removal may appear as shown in Fig. 2, and both units may have the union parts and fittings correspondingly arranged so as to be identical with each other for replacement. It is to be noted that the connections 25 and 26 are made to the central plate 33 of the gauge units for a balanced support and aligned flow passage.

The seats in the union fittings may be plane, but are preferably of the ball joint type in order to allow for any warping that may occur in the gauge units or in the nipple, pipe connections or heads 16, 17. Thus the union fittings can be made tight without any leakage. Preferably, when the gauge 10 is removed by opening the unions 18, and one of the gauge units 11, 12 is replaced, the unions 28 are opened and may be only slightly tightened by the rings 28. Then the gauge 10 is again mounted and the unions 18 tightened fully, after which the unions 28 are given the final tightening. Any lack of alignment will thus have no effect. It will be further noted that this removal and replacement is aided by the interchangeable heads 16, 17. If one gauge unit is completely disassembled, this can be done without affecting the other.

When the water level is normal it will show in both gauge units. When the gauge 10 is to be blown down, the valve 24 is opened, causing water and steam to flow down simultaneously through both gauge units.

It may be noted that the heads 16, 17 permit either gauge unit 11, 12 to be blown down alone, to concentrate the entire flow therein. Thus an element may be removed, such as a plug 20 or 22 for the gauge unit 11, or the plug 19 or valve 24 for the gauge unit 12, and the adjacent passage plugged for the blow down, then opened, and the appropriate element replaced. For example, to blow down unit 11 alone, valve 24 remains closed, plug 22 is removed for the blow down, and the plug 19 is removed and a removable ball like element is dropped in to close the pipe 27 and rest therein without closing the head 16, then the plug 19 is replaced. After the blow down, the plug 19 is removed, the ball like element withdrawn, then the plugs 19 and 22 are again inserted. During this blow down the valve 14 may be closed while the valve 13 may be open. For this purpose the plugs 19 and 20 may be regarded as valves adapted to rotatably open and close the vertical passages to the respective gauge units.

The use of the heads 16, 17 with their threaded connections, as well as such threaded connections for the gauge units makes the employment of the ball seat unions 28 highly desirable, because it is extremely difficult in ordinary production to obtain perfectly aligned threads, especially where quite a number of threaded holes are interconnected in a closed series.

I claim:

1. A liquid level gauge for high pressure boilers including a plurality of liquid level units each having a central channel plate for opposed glass plates, said units being connected in parallel, side by side, offset relation to each other, and mounting means for the gauge units so interconnecting the central plates including portions in alignment with said channels, and ball joint union fittings in the mounting means whereby the gauge units can be separated and reconnected irrespective of the occurrence of warping in the gauge.

2. A liquid level gauge for high pressure boilers including a plurality of water level gauge units of like, interchangeable construction disposed side by side but at different elevations so as to overlap each other, a head above the top of the upper unit and a like head below the bottom of the lower unit, said heads being adapted for connection to the valves of the water column of a boiler, nipples connecting the heads to the top of the upper unit and to the bottom of the lower unit respectively, pipes threadedly connecting the heads with the top of the lower unit and with the bottom of the upper unit respectively, and a union fitting in each pipe, whereby the gauge units can be separated, each union fitting having a ball-joint seat to allow for warping due to heat.

3. A liquid level gauge for high pressure boilers, including a plurality of water level gauge units of like interchangeable construction disposed side by side but at different elevations so as to overlap each other, each gauge unit being straight throughout its length, heads at the respective upper and lower ends of the upper and lower gauge units, threaded connections separate of the heads and of the gauge units interconnecting each head with both gauge units whereby passages are afforded for intercommunicating the gauge units in a circulatory manner, and union fittings in certain of the connections, one union fitting being above the lower gauge unit and the other union fitting being below the upper gauge unit, each union fitting having two threaded portions and a collar shouldered on one of said portions and being threadedly connected to the other portion.

4. A liquid level gauge for high pressure boilers including a plurality of water level gauge units of like interchangeable construction disposed side by side but at different elevations so as to overlap each other, each gauge unit being wholly straight from end to end thereof, and means interconnecting the top portions of the gauge units and the bottom portions thereof for a circulatory relation of the gauge units, said means being detachable from the gauge units, and said means including a head at the top portion of the upper gauge unit and a head at the bottom portion of the lower gauge unit, connections between the upper head and the top portions of both gauge units and connections between the lower head and the lower portions of both gauge units, said connections having threaded engagement with the head and with the gauge units, and one connection for each head having a three-piece union fitting comprising a threaded collar.

5. A liquid level gauge for high pressure boilers, including a plurality of water level gauge units of like interchangeable construction disposed side by side but at different elevations so as to overlap each other, each gauge unit being straight throughout its length, a first means interconnecting the top portions of the gauge units, a second means interconnecting the bottom portions of the gauge units, the said first and second means being separable from the gauge units and being independent thereof except that they serve to interconnect the gauge units in operative circulatory relation to each other, said first and second means lying substantially entirely outside of the gauge units and the latter being separate of each other except for the said means, each of the first and second means consisting of several elements threadedly interconnected with each other and with the gauge units, at least one of the elements of the first and second means being a union fitting having a threaded interconnecting collar.

EUGENE ERNST.